(12) United States Patent
Alexander et al.

(10) Patent No.: US 10,708,976 B2
(45) Date of Patent: Jul. 7, 2020

(54) METHODS AND SYSTEMS FOR A VEHICLE COMPUTING SYSTEM TO WIRELESSLY COMMUNICATE DATA

(71) Applicant: Ford Global Technologies, LLC, Dearborn, MI (US)

(72) Inventors: Stephen Alexander, Livonia, MI (US); Peter Treman, Commerce Township, MI (US); Kenneth James McCaffrey, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 737 days.

(21) Appl. No.: 14/845,882

(22) Filed: Sep. 4, 2015

(65) Prior Publication Data

US 2017/0066389 A1 Mar. 9, 2017

(51) Int. Cl.
| | |
|---|---|
| *H04W 88/06* | (2009.01) |
| *H04W 4/44* | (2018.01) |
| *B60R 16/023* | (2006.01) |
| *H04W 4/80* | (2018.01) |
| B60R 25/102 | (2013.01) |
| H04L 29/08 | (2006.01) |

(52) U.S. Cl.
CPC ........... *H04W 88/06* (2013.01); *B60R 16/023* (2013.01); *H04W 4/44* (2018.02); *H04W 4/80* (2018.02); B60R 25/102 (2013.01); H04L 67/12 (2013.01)

(58) Field of Classification Search
CPC ... B60R 16/023; B60R 25/00; B60R 16/0373; B60R 25/102; H04W 4/046; H04W 4/008; H04W 88/06; H04W 84/12; H04W 84/042; H04W 84/005; H04W 4/206; H04L 67/12
See application file for complete search history.

(56) References Cited

U.S. PATENT DOCUMENTS

| | | | |
|---|---|---|---|
| 6,760,832 B2 | 7/2004 | Nishimoto et al. | |
| 7,467,029 B2* | 12/2008 | Forest | B60W 50/029 340/507 |
| 8,958,315 B2* | 2/2015 | Preston | B60R 25/00 370/252 |
| 9,326,089 B2* | 4/2016 | Xia | H04W 4/005 |
| 9,380,507 B2* | 6/2016 | Bradley | H04W 36/24 |
| 2005/0065779 A1* | 3/2005 | Odinak | G10L 15/30 704/201 |

(Continued)

FOREIGN PATENT DOCUMENTS

| | | |
|---|---|---|
| CN | 103825633 A | 5/2014 |
| CN | 104477112 A | 4/2015 |
| CN | 104486395 A | 4/2015 |

*Primary Examiner* — Jason Holloway
(74) *Attorney, Agent, or Firm* — Michael Spenner; Brooks Kushman P.C.

(57) ABSTRACT

A vehicle system has a first communication processor connected to a vehicle network, a second communication processor connected to the first communication processor, and a vehicle processor configured to communicate with the first and second communication processors. The vehicle processor is programmed to, in response to received vehicle data via the vehicle network, communicate the vehicle data to a server via the first communication processor. The vehicle processor is further programmed to, in response to received infotainment data via the second communication processor, output the infotainment data to a display.

12 Claims, 4 Drawing Sheets

(56) References Cited

U.S. PATENT DOCUMENTS

| | | | |
|---|---|---|---|
| 2006/0126256 A1* | 6/2006 | Forest | B60W 50/029 361/139 |
| 2007/0022173 A1* | 1/2007 | Tamura | H04L 67/125 709/207 |
| 2007/0067632 A1* | 3/2007 | Kaihori | B60R 25/24 713/169 |
| 2008/0012725 A1 | 1/2008 | Zoladek et al. | |
| 2008/0167758 A1* | 7/2008 | Louch | H04L 12/66 701/2 |
| 2010/0017543 A1* | 1/2010 | Preston | B60R 25/00 710/16 |
| 2010/0171642 A1* | 7/2010 | Hassan | G01C 17/38 340/992 |
| 2012/0083971 A1* | 4/2012 | Preston | B60R 25/00 701/36 |
| 2012/0307722 A1* | 12/2012 | Thach | H04L 29/08846 370/328 |
| 2012/0330498 A1* | 12/2012 | Nagara | G06F 13/382 701/33.2 |
| 2013/0317668 A1* | 11/2013 | Tarnutzer | H04L 12/40006 701/2 |
| 2014/0364119 A1* | 12/2014 | Bradley | H04W 36/24 455/436 |
| 2015/0373479 A1* | 12/2015 | Xia | H04W 4/005 455/420 |

\* cited by examiner ated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

METHODS AND SYSTEMS FOR A VEHICLE COMPUTING SYSTEM TO WIRELESSLY COMMUNICATE DATA

TECHNICAL FIELD

The present disclosure generally relates to vehicle computing systems, and more particularly, to a vehicle computing system communicating data to a remote server.

BACKGROUND

A vehicle computing system is used to communicate information related to several features and functions including vehicle performance, hands-free calling, navigation information and music to an occupant while traveling to a destination. The vehicle computing system receives a portion of the information related to the features and functions from one or more processors in communication over a vehicle network.

The vehicle computing system may communicate the information related to the features and functions to a remote network and/or a connected device. The remote network and/or connected device may provide additional information for the features and functions. The information related to the features and functions have included software updates, diagnostic analysis, music, and navigation information. In one example, the remote network can be configured to communicate vehicle diagnostic information to the vehicle computing system. The diagnostic information can be communicated to a processor over the vehicle network. In another example, the connected device can have additional features and functions designed to integrate with an infotainment system of the vehicle computing system. The connected device communicating with the vehicle computing system may bring the additional features and functions to the vehicle occupant via the infotainment system. The vehicle computing system may manage the additional information from the connected device by transmitting commands to an associated processor executing the feature and function.

SUMMARY

In at least one embodiment, a vehicle system has a first communication processor connected to a vehicle network, a second communication processor connected to the first communication processor, and a vehicle processor configured to communicate with the first and second communication processors. The vehicle processor is programmed to, in response to received vehicle data via the vehicle network, communicate the vehicle data to a server via the first communication processor. The vehicle processor is further programmed to, in response to received infotainment data via the second communication processor, output the infotainment data to a display.

In at least one embodiment, a vehicle communication method has a first and second communication processor to manage communicated information to and from a vehicle. The method includes, in response to received vehicle data from one or more processors via a vehicle network, transmitting the vehicle data to a preidentified server via a first communication processor. The method further includes receiving infotainment data formatted in a predefined application program interface from a public server via a second communication processor and ouputting, via a vehicle processor, at least one of the vehicle data and infotainment data to a vehicle display.

In at least one embodiment, a computer-program product embodied in a non-transitory computer readable medium having stored instructions for programming a processor, comprises instructions for communicating vehicle data received from one or more processors connected to a vehicle network to a server via a first communication processor on a private cellular carrier virtual network. The computer-program product includes further instructions for communicating infotainment data to a remote device via a second communication processor connected to the first communication processor and outputting at least a portion of the infotainment and vehicle data to a display.

DETAILED DESCRIPTION

Figure 1:
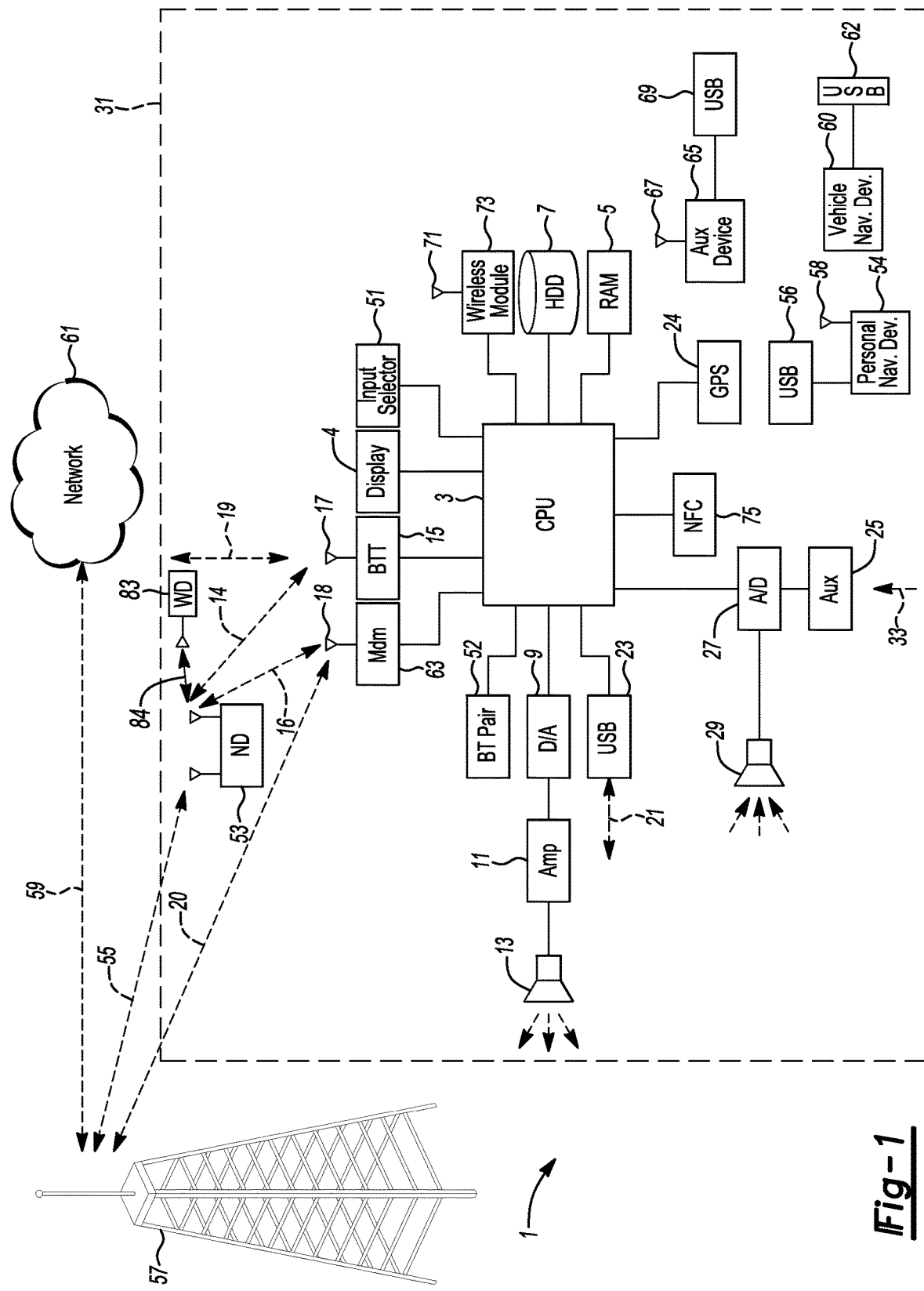
FIG. 1 is a representative topology of a vehicle computing system implementing a user-interactive vehicle information display system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The disclosure relates to a vehicle computing system configured to use multiple communication processors to manage data communicated to a server, a connected device, and/or a combination thereof. The vehicle computing system may be configured to communicate with one or more processors via a vehicle network. The one or more processors may perform several vehicle functions based on information distributed via the vehicle network. In one example, the information may be received from a remote network and communicated to the one or more processors via the vehicle network. The vehicle computing system may manage the information received from the remote network based on the implementation of the multiple communication processors (a dual communication processor configuration, for example). The multiple communication processors may provide an additional security layer to prevent data communicated via an anonymous remote network from being communicated on the vehicle network. For example, the vehicle computing system implementing the multiple communication processors may manage message(s) received from an unknown network from being communicated to the one or more processors via the vehicle network.

In one example, the vehicle computing system may configure the multiple communication processors by having a first communication processor designated to communicate with a remote secured network and a second communication processor designated to communicate with a connected device, one or more websites via an internet connection, or a combination thereof. The first communication processor may be configured to communicate information from one or more vehicle processors to the remote secured network via the vehicle network. The second communication processor is not directly connected to the vehicle network and may be configured to communicate with one or more "public" servers via the internet connection.

The vehicle computing system may be configured such that the second communication processor is connected to the first communication processor and is not directly in communication with the vehicle computing system. The communication between the first communication processor and second communication processor may be limited. For example, the first communication processor may only communicate data via the second communication processor based on an application program interface and/or a hardwire configuration used to enable or disable a vehicle feature/function. The hardwire configuration between the first and second communication processors may include, but is not limited to, an on/off circuit associated with the vehicle feature/function. Therefore, information received from an unknown remote network via the second communication processor may not be communicated over the vehicle network.

FIG. 1 illustrates an example block topology for the vehicle computing system (VCS) 1 for a vehicle 31. An example of such a VCS 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor 3 allows onboard processing of commands and routines. Further, the processor 3 is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor 3 is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor 3. Although not shown, numerous vehicle components and auxiliary components in communication with the VCS 1 may use a vehicle network (such as, but not limited to, a CAN bus) to pass data to and from the VCS 1 (or components thereof).

Outputs to the system may include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (cell phone, smart phone, PDA, or any other connected device having wireless remote network connectivity, for example). The nomadic device 53 can then be used to communicate 59 with a network 61 outside the vehicle 31 through, for example, communication 55 with a cellular tower 57. In some embodiments, tower 57 may be a WiFi access point. The nomadic device 53 may also be used to communicate 84 with an accessory device such as a wearable device 83 (smartwatch, smart glasses, etc., for example). The nomadic device 53 may communicate 84 one or more control functions to the wearable device 83. For example, the nomadic device 53 may enable the wearable device 83 to accept a phone call, enable a mobile application, receive notifications, and/or a combination thereof. In another example, the wearable device 83 may transmit vehicle control features/functions to the VCS 1 based on one or more mobile applications executed at the nomadic device 53.

In one example, the VCS 1 may be configured to have one or more communication processors. The one or more communication processors may be assigned to communicate with a predefined remote network, a remote public network and/or nomadic device. For example, the one or more communication processors may include a first and second communication processor. The first communication processor may include an embedded cellular phone that is configured to communicate with a secured network via a private cellular carrier virtual network. The second communication processor may be the BLUETOOTH transceiver 15. In response to the second communication processor configured to communicate with the CPU 3, the VCS 1 may enable communication with the network 61 based on data associated with an application program interface. The VCS 1 may enable communication with the network 61 via the second communication processor.

Communication between the nomadic device 53 and the BLUETOOTH transceiver is represented by signal 14. Pairing a nomadic device 53 and the BLUETOOTH transceiver 15 can be instructed through a button 52 or similar input. Accordingly, the CPU 3 is instructed so that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having an antenna 18 in order to communicate 16 data between CPU 3 and network 61 over the voice band. The nomadic device 53 may then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

Continuing from the example above, the second communication processor may be the modem 63. The second communication processor may be configured to limit the communication of data with the CPU 3. For example, the CPU 3 may allow communication of data with the second communication processor based on an application program interface and/or a hardwire design. The hardwire design may include one or more circuits designed to enable/disable vehicle features and functions based on a message received from the second communication processor. The CPU 3 may receive data communicated from the second communication processor via the application program interface. The second communication processor (modem 63, for example) may establish communication with the network 63 including one or more public servers.

In one illustrative embodiment, the processor 3 is provided with an operating system including an application program interface to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the nomadic device 53 includes a modem for voice band or broadband data communication.

In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), and Space-Domain Multiple Access (SDMA) for digital cellular communication. These are all ITU IMT-2000 (3G) compliant standards and offer data rates up to 2 Mbs for stationary or walking users and 385 kbs for users in a moving vehicle. 3G standards are now being replaced by IMT-Advanced (4G) which offers 100 Mbs for users in a vehicle and 1 Gbs for stationary users. If the user has a data plan associated with the nomadic device 53, it is possible that the data plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11 g network (i.e., WiFi) or a WiMax network.

In one embodiment, incoming data can be passed through the nomadic device 53 via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices can be connected through a wireless 67 or wired 69 connections. The wireless 67 or wired 69 connections may be established using the first and second communication processors (dud dual communication processor configuration, for example). Auxiliary device 65 may include, but are not limited to, personal media players, wireless health devices, portable computers, and the like.

Also, or alternatively, the CPU 3 could be connected to a vehicle based wireless router 73, using for example a WiFi (IEEE 803.11) 71 transceiver. This could allow the CPU 3 to connect to remote networks in range of the local router 73. The first or second communication processors may include the wireless router 73. For example, the first communication processor as the wireless router 73 is configured to communicate with a predefined secured network. The first communication processor may communicate data received from the predefined secured network over the vehicle network system. The data received from the predefined secured network may include, but is not limited to, vehicle diagnostics and software downloads.

In addition to having representative processes executed by a VCS 1 located in a vehicle, in certain embodiments, the processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the processes.

Figure 2:
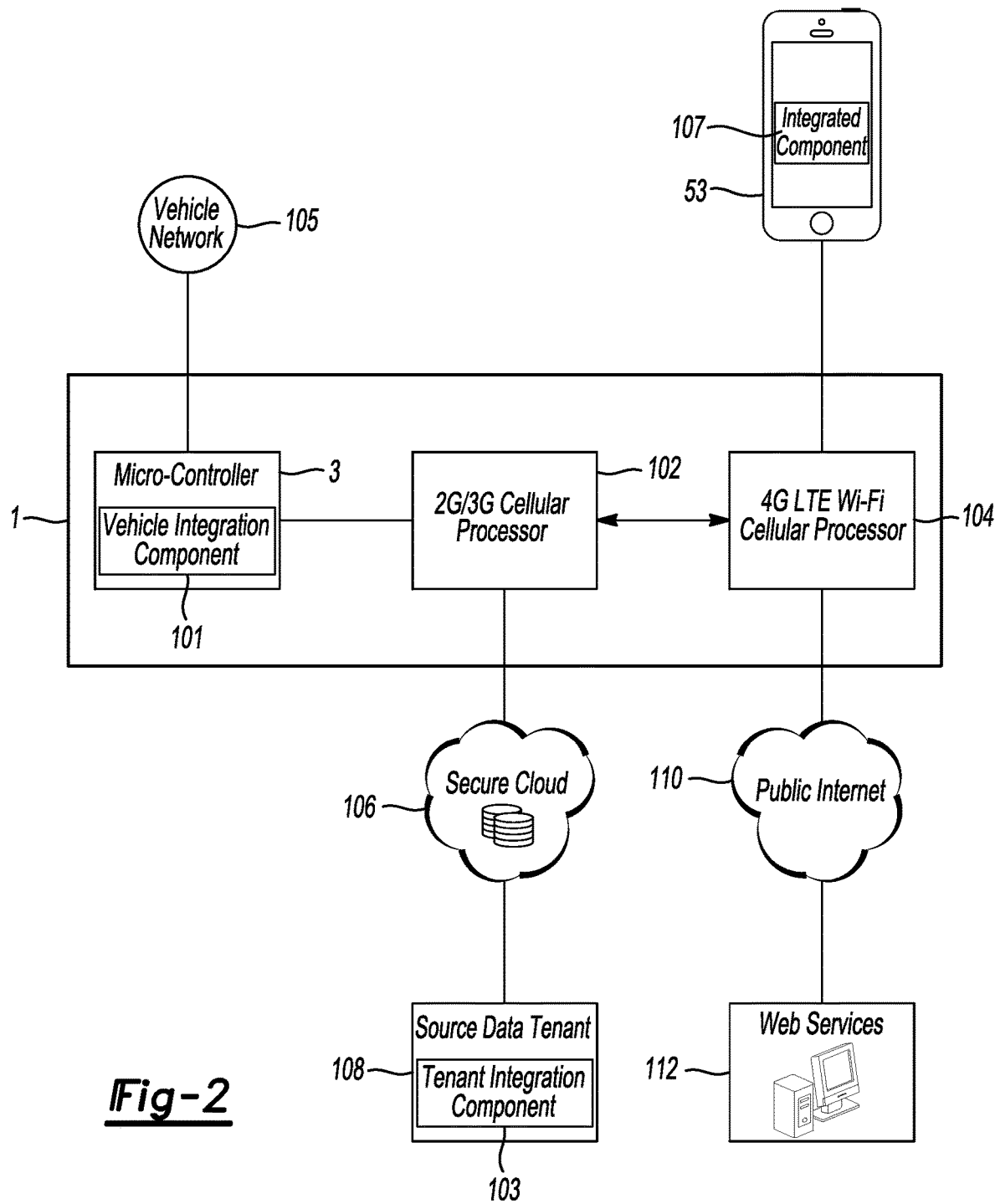
FIG. 2 is a representative block topology of the vehicle computing system having first and second communication processors to communicate vehicle data according to an embodiment.

FIG. 2 is a representative block topology of the VCS having first and second communication processors to communicate vehicle data according to an embodiment. The VCS 1 may be in communication with one or more transceivers via the one or more embedded communication processors (first communication processor 102 and second communication processor 104, for example). The first and second communication processors 102, 104 are capable of wired and wireless communication.

The VCS 1 may include a vehicle integration framework 101 executed at the CPU 3 and configured to provide various services to the VCS 1. These services may include transport routing of messages between the network 61 and the VCS 1, synchronization of one or more infotainment settings, notification services to allow the VCS 1 to receive and provide application data via the network 61, application launch and management facilities to allow for unified access to applications executed by the CPU 3, and point of interest location and management services. As mentioned above, the CPU 3 of the VCS 1 may be configured to interface with one or more applications of various types in communication with the nomadic device 53 and/or network 61. In one example, the VCS 1 may include the CPU 3 in communication with the first communication processor 102. The first communication processor 102 may include an embedded processor and at least one wireless communication technology including, but is not limited to, WiFi, BLUETOOTH, cellular, and/or a combination thereof. For example, the first communication processor may be a Qualcomm MDM9615M LTE modem and a Qualcomm WTR1605L LTE/HSPA+/CDMA2K/TDSCDMA/EDGE/GPS transceiver. The CPU 3 may communicate data from one or more vehicle processors via the vehicle network 105. The VCS 1 may be configured to communicate the data from the vehicle network 105 to a remote network via the first communication processor 102.

In response to the first communication processor 102 having access to communicate data via the vehicle network 105, the VCS 1 may predefine a secured network 106 to allow the communication of data. The secured network 106 may be configured to establish communication between the VCS 1 and a secure data tenant 108. The secured data tenant 108 may further include a tenant integration client component 103 to allow the secured data tenant to take advantage of the data and/or services provided by the vehicle integration framework 101. The tenant integration client component 103 may be referred to as an application. The application is executed on hardware (a processor, for example) at the secured data tenant 108. The application may communicate data from the secured data tenant 108 to the VCS 1 via the first communication processor 102.

The first communication processor 102 may be configured to be a dedicated embedded communication processor for communicating data from the vehicle network 105 to a secure data tenant 108 via the secured network connection 106. The first communication processor 102 may establish communication with the secured network 106 via a private cellular carrier virtual network. For example, the VCS 1 may request data associated with a feature being executed on at least one processor in communication via the vehicle network 105. The first communication processor 102 may receive the requested data for the feature from the secured network 106 and transmit the data to the processor via the vehicle network 105.

The VCS 1 may include the CPU 3 in communication with the second communication processor 104 via the first communication processor 102. The second communication processor 104 may be configured with an embedded processor, a wireless transceiver, and/or a combination thereof. In one embodiment, the second communication processor 104 may be configured to include only a wireless transceiver, including, but not limited to, WiFi, BLUETOOTH, Near Field Communication, cellular, and/or a combination thereof. The first communication processor 102 may limit the communication of data received from the second communication processor 104 to the CPU 3. For example, the communication between the first and second communication processors 102, 104 may be limited to data associated with an application program interface. The first communication processor 102 may have an embedded controller configured to limit communication with the second communication processor 104. For example, in response to received data having an approved application program interface for the first communication processor 102, the VCS 1 may receive the data from a public network 110 via the second communication processor 104. The second communication processor 104 may communicate data to the CPU 3 based on approval from the first communication processor 102.

In another example, the communication between the first and second communication processors 102, 104 may be limited to messages associated with enabling switches at a hardware circuit. For example, a single wire or path circuit configuration between the first and second communication processors may be configured to enable or disable a vehicle feature at the VCS based on a received pull-high or pull-low command. The hardware circuit configuration may provide a management method for data received from one or more websites being executed at unsecured remote servers.

The second communication processor 104 may be configured with one or more transceivers. The one or more transceivers may establish communication with the nomadic device 53, a remote network 110, and/or a combination thereof. For example, the second communication processor 104 may communicate application data with a nomadic device 53 via wireless technology. The wireless technology may include Bluetooth Low Energy (BLE). The VCS 1 and nomadic device 53 may establish communication via the second communication processor 104. The VCS 1 may receive application data executed at the nomadic device using a nomadic device integration component 107. The nomadic device integration component 107 may allow the nomadic device 53 to take advantage of the services provided by the vehicle integration framework 101 and/the secured tenant integration client component 103. For example, the nomadic device 53 may receive vehicle data including one or more feature applications for the vehicle infotainment system. The nomadic device 53 may execute the one or more applications on device hardware and transmit information for the application(s) to the vehicle infotainment system. In one example, the nomadic device 53 may receive a request to execute a navigation application for the vehicle infotainment system via the second communication processor 104. The nomadic device 53 may transmit the navigation data in an application program interface associated with the navigation application to the CPU 3 via the second communication processor 104.

The one or more transceivers of the second communication processor 104 may include a multiport connector hub. The multiport connector hub may be used to interface between the unsecured network 110 and additional types of devices (radar detector, navigation device, etc. for example). The multiport connector hub may communicate with the CPU 3 over various buses and protocols, such as via USB, and may further communicate with the connected devices using various other connection buses and protocols, such as Serial Peripheral Interface Bus (SPI), Inter-integrated circuit (I2C), and/or Universal Asynchronous Receiver/Transmitter (UART). The multiport connector hub may further perform communication protocol translation and interworking services between the protocols used by the connected devices and the protocol used between the multiport connector hub and the CPU 3. The connected devices may include, as some non-limiting examples, a radar detector, a global position receiver device, and a storage device.

Figure 3:
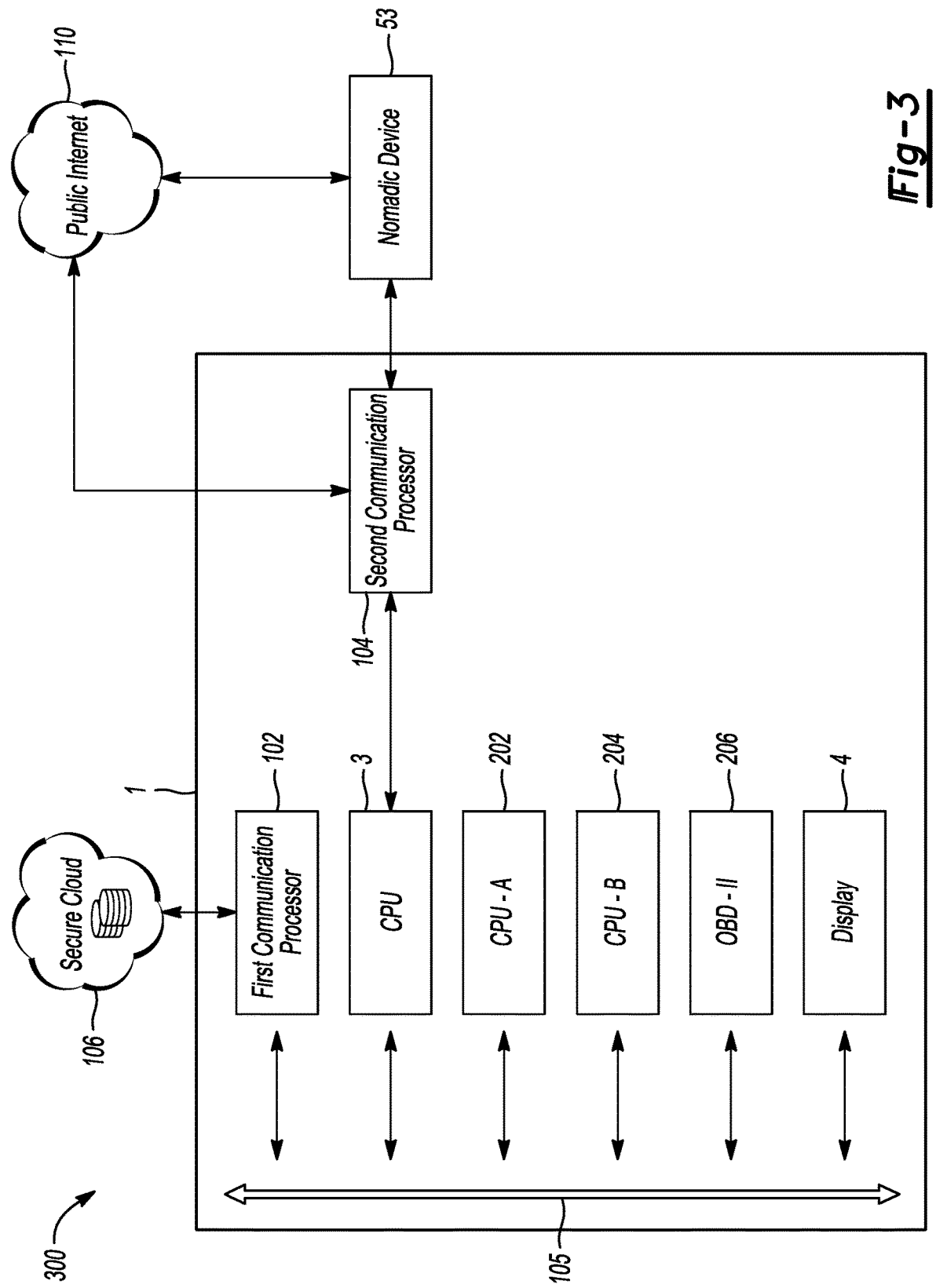
FIG. 3 is a representative block topology of a vehicle network for the vehicle computing system including the first and second communication processors according to an embodiment.

FIG. 3 is a representative block topology of a vehicle network 105 for the VCS 1 including the first and second communication processors 102, 104 according to an embodiment. The vehicle network 105 communicates with several processors including, but not limited to, the first communication processor 102, CPU 3, CPU-A 202, CPU-B 204, and display 4. The vehicle network 105 may include an on-board diagnostics (OBD-II) port 206 to allow access to the status of various vehicle systems and subsystems. The first communication processor 102 may be connected to the vehicle network 105 and configured to communicate data exclusively with the remote secured network 106. The second communication processor 104 may be connected to the CPU 3 and may be configured to communicate with one or more publically available servers 110. The CPU 3 may be configured to limit data communicated via the second communication processor 104. For example, the CPU 3 may be configured to communicate data with the second communication processor 104 associated with an application program interface. In another example, the CPU 3 may be configured to limit data communicated with the second communication processor 104 via a hardware circuit design.

For example, the VCS 1 including two or more communication processors provides communication of vehicle data from the remote secured network 106 being transmitted through the first communication processor 102 (embedded cellular chip, for example) to the vehicle network 105. The first communication processor 102 enables the VCS 1 to securely transport vehicle data to and from a vehicle network 105 via a micro-controller connection (embedded processor at the first communication processor, CPU3, or a combination thereof, for example).

In one example, a diagnostic tool may be connected to the OBD-II port 206 for establishing communication with one or more processors (CPU 3, CPU-A 202, CPU-B 204, etc. for example) via the vehicle network 105. The diagnostic tool may request for additional data to be communicated to the secured network 106 via the first communication processor 102. For example, the diagnostic tool may request the transmission of one or more driver performance variables to the secured network 106 via the first communication processor 102. In another example, the diagnostic tool may request a software download for the CPU-A 202 from the secured network 106 via the first communication processor 102.

The VCS 1 may have the second communication processor 104 (an embedded cellular phone, Wi-Fi module, or a remote cellphone connected to the processor using a Bluetooth transceiver, for example) configured to receive data over a public Internet connection. The second communication processor 104 may receive infotainment data via the Internet connection for output at one or more vehicle output devices. In another example, the second communication processor 104 may provide a WiFi hotspot for the vehicle occupant. The VCS 1 having a dual communication processor configuration may manage vehicle data to be communicated to the secured network 106 via the first communication processor 102 and infotainment data to be communicated to the public Internet network 110 via the second communication processor 104.

The CPU 3 may provide an additional layer of security so that the second communication processor 104 may not have a physical connection to the vehicle network system 105. For example, the vehicle network system 105 may receive information from one or more applications being executed at a nomadic device via the second communication processor 104. The data from the one or more applications may be transmitted in a format recognized in a predefined application program interface by the CPU 3. In response to the data being in an acceptable format, the CPU 3 may transmit the data to one or more processors on the vehicle network system 105. The CPU 3 may process the data received from one or more applications executed at the nomadic device 53 and output the processed data at the display 4.

For example, the nomadic device 53 may transmit data from a public internet network 110 to the CPU 3 via the second communication processor 104. For example, the VCS 1 may request data from the public Internet network 110 via the second communication processor 104. The second communication processor 104 may transmit the request to the public internet network via the nomadic device 53. The requested data may be in a predefined format to enable communication between the public Internet and the vehicle network system 105. If the data from the public Internet is not in the predefined format, the CPU 3 may not allow the data to be communicated over the vehicle network 105. In another example, the requested data may be one or more predefined messages to enable and/or disable a vehicle feature based on a circuit switch being pulled-high or pulled-low.

The VCS 1 may output a portion of data received from the first and second communication processors 102, 104 at the display 4. The data may be presented at the touchscreen display 4 and may be executed by one or more applications at the CPU 3. In another example, the VCS 1 may transmit the received data to the one or more processors in communication with the vehicle network system 105.

Figure 4:
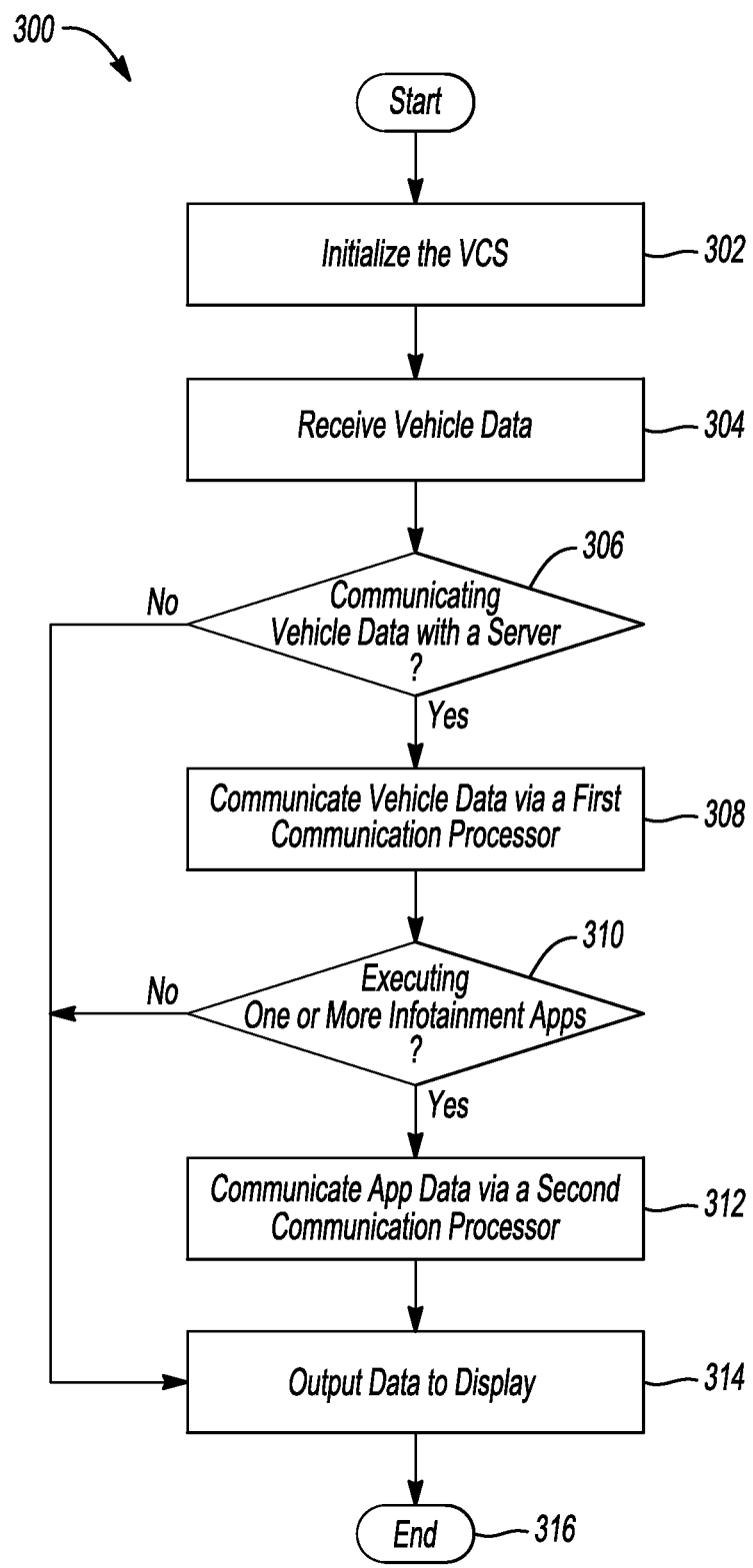
FIG. 4 is a flow chart illustrating an example method of the vehicle computing system managing data communicated via the first and second communication processors according to an embodiment.

FIG. 4 is a flow chart illustrating an example method 300 of the VCS 1 managing data communicated via the first and second communication processors according to an embodiment. The method 300 may be implemented using software code contained within the VCS 1, vehicle network 105, nomadic device 53, remote network and/or a combination thereof.

Referring again to FIG. 4, the vehicle 31 and its components illustrated in FIG. 1, FIG. 2, and FIG. 3 are referenced throughout the description of the method 300 to facilitate understanding of various aspects of the present disclosure. The method 300 of communicating data from one or more networks may be implemented through a computer algorithm, machine executable code, or software instructions programmed into a suitable programmable logic device(s) of the vehicle, such as the CPU 3, the nomadic device control module, a network processor, another controller in communication with the vehicle computing system, or a combination thereof. Although the various operations shown in the flowchart diagram 300 appear to occur in a chronological sequence, at least some of the operations may occur in a different order, and some operations may be performed concurrently or not at all.

In operation 302, the VCS 1 may be initialized and enabled based on a key-on position or state of an ignition system. The VCS 1 may initialize one or more applications for execution. In response to the initialization of the VCS 1, the system may display the one or more applications at a user interface. For example, the VCS 1 may execute a network communication application via the vehicle integration framework. The network communication application may manage the communication of data between the VCS 1 and one or more devices and networks in communication with the vehicle computing system.

In operation 304, the VCS 1 may receive vehicle data from one or more processors in communication over a vehicle network. In response to the received data via the vehicle network, the VCS 1 may determine whether the vehicle data should be communicated with a server in operation 306. For example, the VCS 1 may receive vehicle data related to one or more driver performance variables. In another example, the vehicle data may be related to diagnostic data and/or software updates. The VCS 1 may transmit the received vehicle data to a predefined remote network for vehicle performance analysis.

In operation 308, the VCS 1 may communicate the vehicle data via a first communication processor. Continuing from the example above, the first communication processor may be connected to the vehicle network and may communicate the driver performance variables to the predefined remote network. The first communication processor may be preconfigured to allow communication with the predefined remote network.

In operation 310, the VCS 1 may receive a request to execute one or more infotainment applications on hardware of the vehicle computing system. For example, in response to an infotainment application being executed at the VCS 1, the system may request data for the infotainment application from a public internet network. The VCS 1 may communicate the application data to and from the public Internet network via the second communication processor not connected to the vehicle network.

In another example, the infotainment application may be a navigation application. The VCS 1 may generate a navigation route via the navigation application based on data received from a public Internet network. The VCS 1 may receive data from the public Internet network if the data is in a predefined format for the navigation application. In response to the VCS 1 receiving data in an unapproved format from the public Internet network via the second communication processor, the VCS 1 may reject the data from the public Internet network.

In operation 314, in response to the data for the one or more applications and/or vehicle data, the VCS 1 may output a portion of the application data or vehicle data to a vehicle display. Continuing from the example above, in response to the vehicle occupant selecting the execution of the navigation application, the VCS 1 may transmit a request to generate a route based on the current vehicle location and a predefined destination (home address, for example). The VCS 1 may receive the current vehicle location from one or more processors connected to the vehicle network. The VCS 1 may receive the predefined destination from a personal profile stored at a secured network via the first communication processor. The VCS 1 may receive data from a remote public network associated with the route. For example, the data may include traffic data associated with the route, construction data associated with the route, and/or a combination thereof. The VCS 1 may receive the traffic data and/or construction data via the second communication processor. In response to the destination information and data received from the public Internet, the VCS 1 may output a route at the display.

The first and second communication processors may be configured with the VCS 1 such that data from an unsecured remote network may not be communicated over the vehicle network. The VCS 1 may end the method of managing the communication of data using the first and second communication processors based on a detection of a key-off position of the ignition system in operation 316.

While representative embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A vehicle system comprising:
  a first communication processor (FCP) connected to a vehicle network;
  a second communication processor (SCP) connected to the FCP; and
  a vehicle processor configured to communicate with the FCP and SCP, and programmed to,
  in response to received vehicle data via the vehicle network, communicate the vehicle data to a server via the FCP; and in response to received infotainment data via the SCP, output the infotainment data to a display.

2. The vehicle system of claim 1, wherein the vehicle processor is further programmed to, in response to received information from the server via the FCP, output a portion of the information to the display.

3. The vehicle system of claim 1, wherein the FCP is an embedded processor and transceiver having at least one of a WiFi modem or cellular modem.

4. The vehicle system of claim 1, wherein the SCP is at least one of a WiFi, cellular, and BLUETOOTH transceiver.

5. The vehicle system of claim 4, wherein the vehicle processor is further programmed to communicate with a public server using an application program interface at the FCP through a smartphone connection via the BLUETOOTH transceiver at the SCP.

6. The vehicle system of claim 5, wherein the vehicle processor is further programmed to, in response to the infotainment data received from the smartphone via the BLUETOOTH transceiver, configure one or more settings of an infotainment system.

7. The vehicle system of claim 6, wherein the one or more settings is at least one of climate control, music, navigation, and phone settings.

8. The vehicle system of claim 1, wherein the vehicle data is received from one or more processors connected to the vehicle network.

9. The vehicle system of claim 8, wherein the one or more processors is at least one of a body control module, brake control module, battery management system, transmission control module, powertrain control module, and telematics control unit.

10. The vehicle system of claim 9, wherein the vehicle processor is further programmed to, in response to received brake data from the brake control module via the vehicle network, transmit the brake data to the server.

11. The vehicle system of claim 1, wherein the FCP is in communication with the server via a private cellular carrier virtual network.

12. The vehicle system of claim 1, wherein the SCP communicates with the FCP based on at least one of an application program interface and a circuit configuration.

* * * * *